3 Sheets--Sheet 1.
M. W. KIDDER.
Coal-Gas Apparatus.
No. 165,168. Patented July 6, 1875.
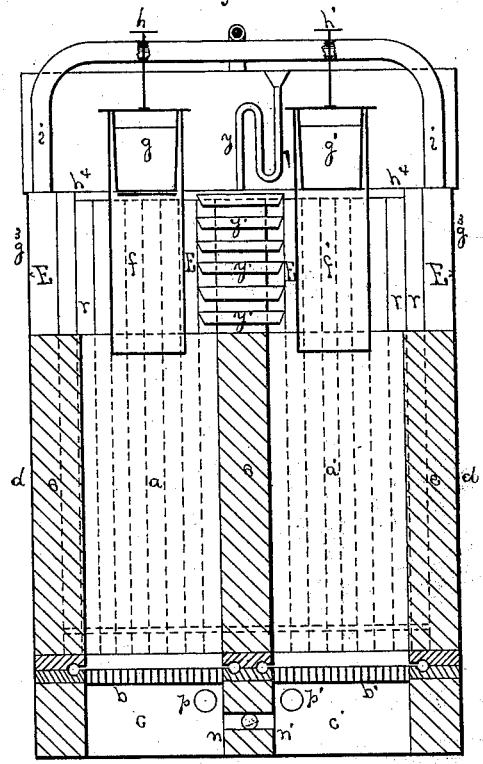
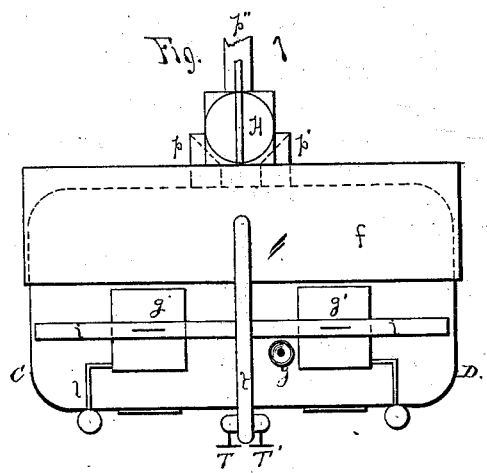
Witnesses
John E. Crane
F. P. Noyes.
Inventor
Moses W. Kidder
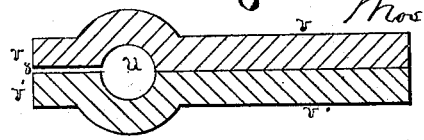

M. W. KIDDER.
Coal-Gas Apparatus.
No. 165,168.
3 Sheets--Sheet 2.
Patented July 6, 1875.
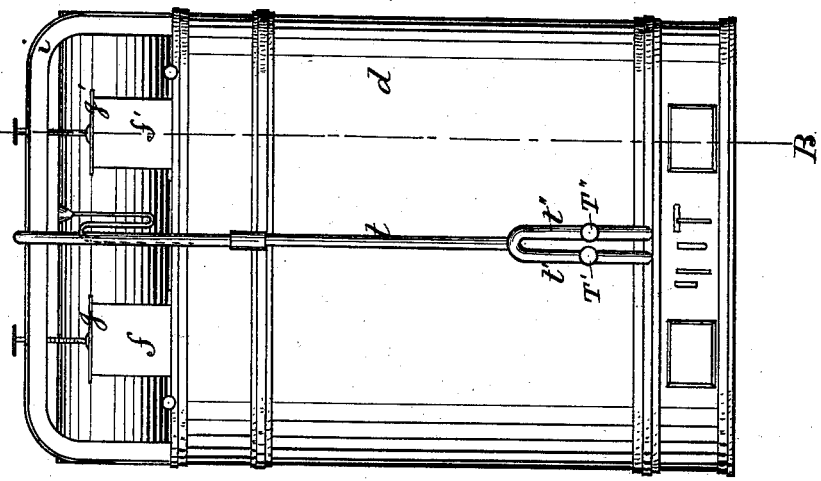
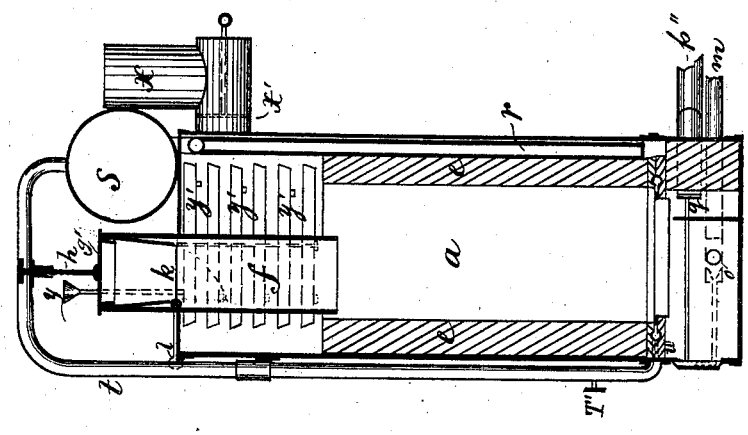
WITNESSES.
John H. Heard
Person Noyes
INVENTOR.
Moses W. Kidder
by Alban Andren
att.

3 Sheets--Sheet 3.

M. W. KIDDER.
Coal-Gas Apparatus.

No. 165,168. Patented July 6, 1875.

WITNESSES:
John K. Heard.
Person Noyes

INVENTOR:
Moses W. Kidder
by Alvan Andren
atty

UNITED STATES PATENT OFFICE.

MOSES W. KIDDER, OF BOSTON, MASSACHUSETTS, ASSIGNOR OF ONE-HALF HIS RIGHT TO PERSON NOYES, OF SAME PLACE.

IMPROVEMENT IN COAL-GAS APPARATUS.

Specification forming part of Letters Patent No. 165,168, dated July 6, 1875; application filed September 1, 1874.

*To all whom it may concern:*

Be it known that I, MOSES W. KIDDER, of Boston, in the county of Suffolk and State of Massachusetts, have invented certain new and useful improvements in the apparatus which is used for generating and purifying gas for heating, and gas for illuminating purposes, of which the following is a full, clear, and exact description, reference being had to the accompanying drawings, forming a part of this specification, in which—

Figure 5:
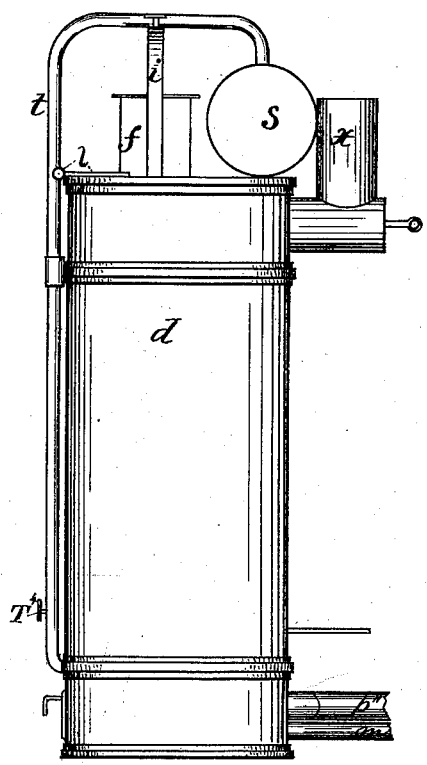
Figure 6:
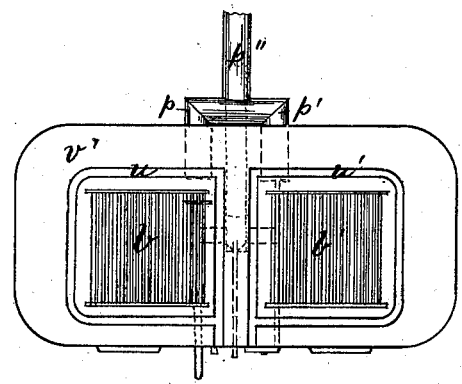

Figure 1 represents a plan or top view; Fig. 2, a vertical section through the line C D of Fig. 1, with an enlarged section, Z, of the plates $v$ and $v'$; otherwise precisely like the same smaller parts shown in Fig. 2 proper. Fig. 3 is a front elevation. Fig. 4 is a vertical section through the line A B of Fig. 3. Fig. 5 is a side elevation. Fig. 6 is a transverse or horizontal section on a level with the grate-bars, beneath which are the ash-pits $c\ c'$.

This invention consists of certain new and useful improvements in gas generating and purifying apparatus or furnaces, which are constructed with two or more compartments for the combustion of coal and the production and purification of gas for heating or for illuminating purposes, said compartments having free and open communication from or near the top of one to or near the top of the other, so that gas or gases formed in one compartment are passed free and without obstruction through the trunk E into and downward through the other, as hereinafter described.

This invention also consists in the combination, with a gas-generating apparatus constructed in two or more compartments or combustion-chambers, having free and open communication one with the other by a trunk, E, as described, of a pipe, $m$, with branches $n$ and $n'$, and a cock or valve, $o$, for the admission of air into either ash-pit, and operative to reverse the current of air from one ash-pit to the other when it becomes necessary or desirable to reverse the current of the gases, as described.

This invention also consists in the construction of the steam-conduits $u$ and $u'$, these being formed by the apposition of the two plates $v$ and $v'$, with grooves and steam outlets or fissures formed therein, and so placed as to deliver the steam at or about a level with the top of the grates $b$ and $b'$, for the double purpose of delivering the steam at the point of the most active combustion of the coal in the chambers $a$ and $a'$, for the purpose of superheating the steam, and at the same time for the purpose of checking the combustion of the coal at and near the lining-walls $e$, to save the walls from destruction from the elevated temperature, which would otherwise result from the active combustion of the coal near the walls.

This invention also consists in the construction of the coal-feeding hoppers $f\ f'$, and their combination with the trunk E above each furnace or compartment, each hopper extending below the top plate of the furnace and through the trunk E, so as to form a reservoir for coal below the gate $k$ within the trunk E, and prevent over-filling or over-feeding the furnace.

This invention also consists in the combination, with a gas-generating apparatus constructed in two or more compartments or combustion-chambers, having free and open communication one with the other by a trunk, E, as described, of one or more evaporating-plates, $y'$, in the space above the middle wall dividing the two combustion-chambers, and a pipe, $y$, leading to said plates, the latter for receiving hydrocarbons for evaporation, and the pipe for conveying hydrocarbons to the furnace, either in a liquid or a vapor form, as described.

My invention also consists in the combination, with a gas-generating apparatus constructed in two or more compartments or combustion-chambers, communicating one with the other by a trunk, E, as described, of a steam-generator, composed of a series of pipes, $r$, and a connected steam-receptacle, S, with pipes $t\ t'\ t''$ and valves T' T'' communicating with the conduits $u\ u'$, and in this connection the air-pipe $m$, with a valve, $o$, and branches $n\ n,'$ leading to each ash-pit, and operating together as described.

In describing the construction of my gas-generating furnace, I begin with the base or foundation plate of iron which forms the floor of the ash-pits, and by suitable ribs upon its upper surface gives support and position to the plates of iron, which form the walls of the ash-pits. The plate forming the front wall of the ash-pits has through it, near each end, a sufficient and suitable opening for the removal of ashes. For closing these openings, suitable gas-tight lids or doors are provided with the necessary appendages for hinging and latching the same. Through this plate, between the ash-pit doors the rods connected with the valves of the air-pipe $m$ and gas-ports $p\ p'$ emerge. The plate forming the back-wall of the ash-pits has, at a point equally distant from each end, an opening to receive the air-pipe $m$ near its lower edge. Above this opening, and at each side, also equally distant from each end, are openings to receive the gas-escape pipes $p\ p'$. The two end plates, near their upper edges, have openings for the passage of shafts of the grate-rockers. These, together with a curved plate at each corner, all joined together with suitable bolts or rivets, complete the outer wall of the ash-pits. This space is divided by two parallel vertical partition-plates extending at right angles from near the middle of the front wall-plate to the back wall-plate, yet sufficiently distant from each other to admit the air-pipe $m$, with its valve, upon the middle line. Each of these plates has an opening for the passage of the branch pipes $n\ n'$. The air-pipe $m$ is provided with a suitable valve or cock, $o$, with its connecting-rod, by which it is moved for directing the air through the inlet-pipes $n\ n'$ to either of the ash-pits $c\ c'$, and to reverse the blast from one ash-pit to the other by giving the cock a half-turn, or closing both of the inlet-pipes $n\ n'$ by a quarter-turn of the valve or cock. All of these walls and partition-plates are of equal height. They receive and support upon their upper edges and form a closed joint with a horizontal plate of iron, $v'$, of nearly the same width, length, and outside form as the base-plate, provided with ribs upon the under side, near the edges, to fit and make a joint with the edges of the wall-plates below, and a rib upon the upper side to fit and make a joint with the lower edge of the sheet-iron casing $d$ above. This plate $v'$ has two large square openings for receiving the grates at each side of, and equally distant from, the middle, corresponding with and opening into the ash-pits, which are entirely separated by the partition-plates between them.

This plate, with the grates, separates the ash-pits below from the combustion or gas-generating chambers above. Valves $q\ q'$, with their connecting-rods passing through the front wall-plate, are provided for closing the gas-ports $p\ p'$. The connecting-rod for opening and closing the air-cock $o$ in the air-pipe $m$ also projects through the front wall-plate between the ash-pit doors. Upon the upper side of the plate $v'$, parallel with, and near each side of the openings to the ash-pits, are grooves, which form the lower side of steam-conduits $u\ u'$ with their inlets from the front edge of the plate $v'$. Between these grooves and the edges of the large openings for the grates the plate is reduced in thickness by taking from the grooved side sufficient to allow a fissure for the escape of steam from the conduits to the combustion-chambers, when the conduits are completed by the plate $v$, which overlies the plate $v'$, having grooves upon its under side, and openings corresponding to and covering the like grooves and openings in the plate $v'$, and having its thickness between the grooves and openings reduced by taking from the grooved side to aid in the formation of the fissures for the escape of steam from the conduits to the combustion-chambers.

Instead of reducing the thickness of the plates $v$ and $v'$ at their inner edges to form the fissures for the escape of steam, perforations may be made from the inner edge of or between the two plates leading to the conduits $u\ u'$, and the steam allowed to escape through such perforations.

I would have it clearly understood from the foregoing that the surface of the plates $v\ v'$ when in apposition form a closed joint from the conduits $u\ u'$ to the outer edge of the plates $v\ v'$; also, between the adjacent sides of the conduits $u\ u'$ near the middle of the plates $v\ v'$.

Now, the several parts are firmly secured to each other by substantial bolts reaching through the base-plate and the two plates $v\ v'$, and all joints between the plates are cemented, so as to render the ash-pits gas-tight, except through the grates, when the valves $q\ q'$ and the cock in the air-pipe $m$ and the ash-pit doors are closed tight and secure against the passage of air or gas from one ash-pit to the other. Thus, having completed the base of the furnace, I next put in the grates $b\ b'$, forming the floor of each combustion-chamber; then fit the lower section of the sheet-iron casing $d$ to the rib upon the upper side of the plate $v'$, extending it upward to another rib near the top of the furnace, to which it is also fitted and screwed; then the steam-generating pipes or bars $r\ r$ are placed inside of the casing $d$, and a lining, $e$, and partition-wall $e$ are built of fire-brick to the top of the rib above referred to, at the upper edge of the lower section of the outer casing. The combustion-chambers $a\ a'$ are of equal size and like form, corresponding in horizontal section, in size and form, with the openings for the grates in the plates $v\ v'$. Thus to the top of the lining $e$ and partition-wall $e$ the two combustion-chambers are entirely distinct and separate from each other, and to this point presenting no essentially new feature in the ash-pits or combustion-chambers, these having been previously constructed in a similar manner, but the pipe provided and arranged for admitting air into either of the ash-pits, so as to reverse the current of air from one to the other, and the construction of the steam-conduits by the two plates $v$ and $v'$ with the grooves and the steam-outlets, and fitted together, and in a position at or about a level with the tops of the grates, are believed to be new.

Above the lining and partition wall $e\ e$, and from the rib at the top of the lower section of the outside casing, I extend a casing, $g^3$, upward from twelve to eighteen inches to a rib upon the under side of the top plate $h^4$, with which it forms a joint. This extension of the upper casing $g^3$ forms a trunk, E, above and connecting two of the combustion-chambers $a$ $a'$, and this trunk E serves the double purpose of a conductor for gases from one combustion-chamber to the other, and also as a receptacle for the introduction of hydrocarbon in a liquid or vapor state to be carried forward by and mixed and combined with the gases passing from one combustion-chamber to the other, and thence downward through the coal and the ash-pit, as described. The top plate is nearly as wide, and long, and of the same general outline, as the base plate or floor of the ash-pits. Through this plate $h^4$ are two large square openings directly above, and corresponding with the two combustion-chambers beneath. Through these openings and forming joints with the plate I pass the hoppers $f f'$, for receiving and supplying coals to the combustion-chambers beneath. Through this top plate, also between the hopper $f f'$, passes the pipe $y$ for the supply of hydrocarbons in a liquid or vapor form through the same pipe, and when introduced in vapor form it is apparent that the plates would not be required; but as they are no obstruction to the flow of gases from one combustion-chamber to the other, they are retained in position to be used when wanted. Two of the steam-generating pipes, $r\ r$, which communicate with the steam-drum $s$ above the top plate, also pass through the latter, and by suitable iron rods, running down to and being secured in the plates $v\ v'$, the top plate is confined in place, and the whole outside structure is securely bound together. The trunk E above the partition-wall $e$ and below the top plate is ample, free, and open for the gases generated in one combustion-chamber to flow over the top of the partition-wall $e$ to the space above the coal in the other combustion-chamber, and downward through it when impelled either by a direct or exhaust blast of air through the pipe $m$ and through one of the branch pipes, say, $n'$, through the grate $b'$ and the combustion-chamber $a'$, through the space or connecting trunk E between the two combustion-chambers, over the top of the middle wall $e$, thence downward through the incandescent coal contained in the combustion-chamber $a$, and through the grate $b$ to the ash-pit $c$, and from this through the pipes $p$ and $p''$ to the hydraulic main.

One essential feature of novelty in this invention, and which confers utility by rendering the apparatus practicable, is the construction of that part of the furnace above the combustion-chambers, so as to form or produce an open space or passage, E, above the middle wall $e$ for the free passage of gases from one chamber to the other, and vice versa, as before described.

The hoppers $f f^1$ extend upward from a line within the furnace at about the level of the top of the fire-brick lining $e$ and partition-wall $e$ through, and to a sufficient height above, the top plate to receive and contain from fifty to one hundred pounds of coal above the false bottoms or gates $k\ k'$, when closed. There exists a necessity for the downward extension $f f'$ of the hoppers through the trunk E, and to a point near a level with the top of the fire-brick lining and the middle wall $e$, in order to conduct all the coal placed in the hoppers through the trunk E, and directly into each subjacent combustion-chamber, since without such extensions of the hoppers, upon opening either gate $k$ or $k'$, to discharge coal into the subjacent combustion-chamber, the coal would be scattered about the trunk E upon the top of the fire-brick lining, and the middle wall $e$, and over the wall into the opposite combustion-chamber, and there would be no reliable accuracy in charging either of the combustion-chambers, or of producing gas therein of reliable and uniform quality. Moreover, the freedom of motion of the gates $k\ k'$ in these extensions indicates the want of coal in the combustion-chamber beneath, as when coal is present in these extensions the motion of the gates is obstructed, indicating that the subjacent combustion-chamber is fully charged with coal, while without these extensions the freedom of motion of the gates $k$ could not be relied upon as evidence of want of coal in the combustion-chamber beneath the hoppers. The extensions $f f'$ are also of great importance in protecting the gates $k\ k'$ from being warped, or twisted, or injured by the force of the fire in each combustion-chamber, being partially filled with unignited coal, which not only prevents the force of heat reaching the gates above, but the unignited coal prevents the extensions becoming heated in any great degree. The trunk E and the extensions $f f'$ co-operate in the production of the result of feeding the coal, and of producing gas with accuracy and precision, and of passing the gas from one combustion-chamber to the other, and about equal quantities of gas (and downward as described) from each combustion-chamber. The extensions $f$ and $f'$ are each a fixture in themselves, and no part of either of such extensions proper is removable or adjustable; and the said coal-feeding hoppers composed in part of said extensions would be inoperative but for the external operating mechanisms for opening the gates $k$ and $k'$ to feed in coal, and to close said gates after coal has been deposited in either extension $f$ or $f'$ from the closed chambers above the gates. The gates $k\ k'$ are fixed upon rotating shafts within the hoppers, which shafts projecting from the sides of the hoppers and a little above the top plate, are moved by the levers $l\ l'$, to which levers are fixed counter-weights to close the gates $k\ k'$ after the coal is emptied into the lower part of the hoppers below the gates. These hoppers are also furnished with gas-tight covers $g\ g^1$, which are, when in place, confined by the screws $h\ h^1$, which pass through suitable nuts in the frame $i$, which is fixed to the top plate.

Immediately below the top plate at the rear side of the trunk E, and connected with the trunk, I provide a smoke-pipe, $x$, furnished with a gas-tight valve, $x'$. The purpose of this pipe $x$ is to convey smoke from the combustion-chambers $a\ a'$ through the trunk E to the chimney when the fires are being kindled, and the valve $x'$ is to close the pipe $x$, and arrest the passage of gas from the combustion-chambers after the fires are kindled. When charged with coal and the latter ignited, as described, either combustion-chamber $a\ a'$ becomes a gas-purifying apparatus, which purifies the gas generated in another connected furnace or combustion-chamber, and passed downward through it, and the incandescent coal has its incandescence revived by an upward current of air passing through it.

Below the top plate, between the lower end of the hoppers $f\ f'$ and above the middle wall $e$, I place a series of evaporating-plates, $y'$, for the evaporation of liquid hydrocarbons received through the pipe $y$. These plates are so placed, one below another, as to allow the liquid hydrocarbon to fall from the upper plate to the one next below in the series, and so on. Between these plates are spaces which allow the gases produced in either combustion-chamber to sweep through to the space above the other combustion-chamber, and through it, as before described, bearing along the vapors of the hydrocarbons.

When gas for heating purposes only is produced, or when rich bituminous coal is used, then the liquid hydrocarbons and the use of the evaporating-plates may be dispensed with. Above the top plate and in the rear of the hoppers $f\ f'$, in connection with two of the pipes $r\ r$, is a steam-drum, $s$, for the reception of steam from the steam-generating bars $r\ r$, and delivery of steam through the pipe $t$, and branches $t'\ t''$, and valves $T'\ T''$ to the steam-conduits $u\ u'$. I will here state that substantially the same apparatus would result from connecting two or more like or similar separate single furnaces by a pipe or pipes, either above or below, and near the top of the coal in each, and conveying the gases through such pipe or pipes from one furnace to the other, and through the incandescent coal, as before described, and that such an arrangement would be no departure from the merits and principles of my invention, but would be an obvious substitute one for the other; but I prefer to construct my furnace, with its two or more combustion-chambers, within the same outward casing, for economy of space and heat, as well as in the cost of construction.

Thus having fully and minutely described my improved gas-generating and gas-purifying apparatus, I now proceed to describe its operation.

With both gas-ports $p\ p'$ closed by the valves $q\ q'$, also the cock in the air-pipe $m$ so turned as to close both of the inlet branch-pipes $n\ n'$, the steam-valves $T'\ T''$ also being closed, I open the doors to both of the ash-pits $c\ c'$, and the valve $x'$ in the smoke-pipe $x$ leading to the chimney. I then introduce proper kindling materials (charcoal and anthracite) upon the grates $b\ b'$ in each of the combustion-chambers $a\ a'$, in sufficient quantity to insure a steady fire, and a reliable body or bed of incandescent coal upon each of the grates $b\ b'$ to effectively act as a screen or purifier for the arrest and reduction of carbonic-acid gas to carbonic-oxide gas, and for the conversion of all tarry matters from bituminous coal, or other hydrocarbons, with the mixed gases produced from the coal, into permanent illuminating-gas. Water is next supplied to the steam-generating bars or pipes $r\ r$. Fire is now kindled in both of the combustion-chambers $a\ a'$; the ash-pit doors and valve $x'$ in the smoke-pipe $x$ all remain open until the anthracite is well kindled, when the ash-pit doors are both closed and secured. Next the valve $x'$ in the smoke-pipe $x$ is closed; then the valve $q'$ covering the gas-port $p'$ is opened from the ash-pit $c'$. The air-cock in the pipe $m$ is now opened, and a blast of air introduced through branch pipe $n$ to the ash-pit $c$, and steam is admitted through the valve $T'$, the pipe $t'$, and conduit $u$, with its fissure 8, to the combustion-chamber $a$. Bituminous coal is now introduced to both of the combustion-chambers $a\ a'$ through the hoppers $f\ f'$, and hydrocarbons through the pipe $y$, either in a liquid form to fall upon the evaporating-plates $y'\ y'$, or in the form of vapor to mingle with the gases in the upper part of the furnace, above the combustion-chambers. The air-blast at the ordinary or an elevated temperature thrown through the branch pipe $n$ into the ash-pit $c$ passes upward between the grate-bars $b$, supplying to the coals near the grate $b$ oxygen in sufficient quantity to convert the carbon into carbonic acid, and insure an energetic fire. The steam flowing from the fissure of the conduits $u$ upon all sides of the combustion-chamber $a$, on a level with the grate $b$, creeps upward near the lining-wall of the combustion-chamber, where the heat is most intense, abstracting heat from the wall and the adjacent burning coal, becoming itself first superheated, and afterward decomposed, in its passage through the incandescent coal, above the coal in active combustion, its oxygen combining with the carbon to form carbonic oxide, and its hydrogen is set free, mingling with the gases. The effect of admitting steam at this point upon the lining of the combustion-chamber is to preserve the wall from being destroyed, by the formation of slag, as the temperature is reduced by the contact of the inflowing steam. A further great advantage resulting from the admission of steam at this point is the fire is not checked, as it would be if the steam was admitted below the grate, and mingled with the air.

The carbonic acid first formed near the grate is forced upward through a deep bed of incandescent coal, by which it is reduced to carbonic oxide. Passing into the space or trunk E above the bed of coals from the combustion-chamber $a$ is a combination of inflammable and other gases, varying in the proportion of the several ingredients, and consisting of carbonic oxide, hydrogen, nitrogen, carbureted hydrogen, and hydrocarbon vapors, from the bituminous coal and carbonic acid. These gases are all mingled with each other and with the vapors of hydrocarbons, which are now introduced through pipe $y$, and with an additional volume of hydrogen and hydrocarbon vapors distilled or roasted from bituminous coal near the top of the combustion or gas-generating chambers $a\ a'$. All of these gases and vapors, thus mingled, having no other possible escape, are driven downward through the combustion or gas-generating chamber $a'$, which, being filled with incandescent coal, and not supplied with air, acts as a screen or purifier, to arrest any carbonic acid which may have escaped from the chamber $a$, and demands half of its oxygen, thus reducing it to carbonic oxide, and insuring against the possible presence of carbonic acid in the ultimate product; and, further, for the arrest of all tarry matters distilled from the bituminous coal or other hydrocarbons, and their conversion, in combination with the other gases produced from the various forms of carbon employed, together with the steam and air, into fixed and incondensable gas. The fixed gas, being driven down through the grate $b'$ into the ash-pit $c'$, escapes through the port $p'$ and pipe $p'$ and connecting-pipes to the hydraulic main. After continuing the process for a time the fire in the combustion-chamber $a'$ gets low, as it receives no oxygen to keep it alive, except from the carbonic acid. The fire in the combustion-chamber $a$ is in an intense state of ignition. I now close valve T', shutting off the steam; next in order the cock $o$ in the air-pipe $m$, and then the valve $q'$ of the gas-port $p^2$, and open the valve $q$ of the gas-port $p$, and the steam-valve T'' and the cock $o$ in the pipe $m$, to admit air through the branch pipe $n'$ into the ash-pit $c'$, by which operations I reverse the currents of the gases in the combustion-chambers, so that the primary compartment in the first of the operation becomes the secondary, and the secondary compartment in the first of the operation becomes the primary, when the currents are so reversed.

Thus, by reversing the currents at proper intervals, and by supplying coal through the hoppers $f\ f$, and the removal of ashes, I am enabled to keep up my fires perpetually. It is not necessary to let the fires go out when the day's work is done, but merely close the air-cock, and the gas-ports, and the steam-valve, and open the valve $x'$ in the smoke-pipe $x$, open the ash-pit doors a little, and the apparatus is converted into an air-tight stove for the night, and the process ceases. In the morning clear the ashes from the ash-pits, supply coals and hydrocarbon, and proceed, as before stated, with the production of gas without further delay.

I have stated that all the mingled gases and vapors, having no other escape, are driven downward through the chamber $a'$, filled with incandescent coal, &c., acting as a screen and purifier, to arrest any carbonic acid which may have escaped from the chamber $a$, &c.

It will be understood that when either of the chambers $a$ or $a'$ are charged with coal in a state of combustion gas will be produced in said chamber with reasonable rapidity, and that when either of said chambers is charged with coal in an incandescent state the gas passed from the chamber of burning coal will be screened and purified by passing through the incandescent coal in the other trunk-connected chamber; and that in neither of said chambers can gas be generated in any sufficient quantity for use and purified at the same time. The coal in a state of combustion in one of said chambers produces gas, while the coal in an incandescent state in the other of said chambers purifies such gas, which, in all cases, is passed from the acting combustion-chamber to the acting gas-purifier through the trunk E. The acting coal-combustion chamber, and the acting gas-purifier, and the trunk E are co-operative elements, and they form a co-operative combination for the production and purification of gas, the gas being made by burning and consuming the coal by the aid of oxygen as contained in air or steam, and not by the roasting process, as in a closed retort, where no oxygen or other element is admitted that will cause or allow the roasting coal to ignite.

It will be observed that I use charcoal, anthracite, bituminous coal, and hydrocarbons in the production of illuminating-gas. This becomes necessary only in the smaller apparatus, where bituminous coal, if used alone, would be likely to melt into large coherent masses, so as to clog the combustion-chambers, and not settle down upon the grates, so as to form a suitable and compact bed or screen of incandescent coal for efficient work in arresting the carbonic acid and the tarry products from the bituminous coal, and their conversion into illuminating-gas.

The charcoal is used as the most reliable for arresting and decomposing carbonic acid and ammonia; the anthracite to insure a steady fire, and, by its weight, to carry down the masses of coke resulting from the roasting of bituminous coal in the upper part of the combustion-chambers; the bituminous coal for the rich hydrocarbons contained in it; and, lastly, the liquid or vapor of hydrocarbons through the pipe $y$, to supply any deficiency in illuminating quality that might result from the small proportion of bituminous coal employed, in comparison with the large volume of gas produced from the anthracite, coke, and charcoal combined with the air and steam, although the whole of the tarry products are converted into gas, and are very efficient in rendering carbonic oxide and hydrogen capable as illuminating-gases when combined with them.

In apparatus with grates two or three feet square, and combustion-chambers built smaller at the top and gradually enlarging to the grates, bituminous coal might be used alone, as it would settle down upon the grates without the liability to obstruction presented in smaller furnaces. Thus the coke resulting from the roasting of the bituminous coal in the upper part of the combustion-chambers is converted near the grate, upon the primary side, by the oxygen of the air and steam, into carbonic oxide, and upon the secondary side forms a suitable body of incandescent coal to convert the mixed gases and hydrocarbon-vapors passing down through it into illuminating-gas, and purifying the gas, and leaving no residue of tar or coke.

In the manufacture of illuminating-gas, one form of well-known gas-producing hydrocarbons is an obvious substitute for another, and either of them, with anthracite, coke, or charcoal, or any two or more of these forms of carbon, would be an obvious substitute for bituminous coal, or bituminous coal is a substitute for either of the forms of carbon named, with any form of gas-producing hydrocarbons.

My improved furnace is not confined in its use to the manufacture of illuminating-gas, as it is most perfectly adapted to the production of gas for heating purposes, as and in the manufactures of steel and glass, where gas rich in hydrocarbons is not desirable, owing to its liability to choke the pipes through which it is conveyed. It is also well adapted for use, in the manufacture of glass, to stain the product an amber color.

I claim as my invention—

1. The combination, in a gas-making furnace, of a trunk, E, connecting the top of one combustion-chamber with another, and serving the double purpose of a conductor for gases, and as a receptacle for hydrocarbon-trays, substantially as described.

2. In combination with a gas-generating apparatus, constructed with two or more compartments or combustion-chambers, $a\ a'$, connected at their tops by a trunk, E, as described, a pipe, $m$, with branches $n\ n'$, and a cock or valve, $o$, for the admission of air into either ash-pit, for the purpose of reversing the current of air from one ash-pit to the other, substantially as described.

3. The steam-conduits $u\ u$, formed by the apposition of the two plates $v$ and $v'$, having inner grooves $u$ and steam-outlets or fissures 8, for the purpose of delivering steam horizontally upon, and about on a level with, the tops of the grates, substantially in the manner and for the purpose described.

4. The coal-feeding hoppers, constructed as described, with fixed extensions $f\ f'$ depending to or near a level with the tops of the combustion-chambers, in combination with and passing through the connecting-trunk E, and provided with gates $k\ k'$, having external operating mechanisms, and with covers $g\ g^1$, substantially as described.

5. In combination with a gas-generating apparatus constructed with two or more compartments or combustion-chambers, having free and open communication one with the other by a trunk, E, as described, one or more evaporating-plates, $y'$, within the trunk E, and a pipe, $y$, leading to the space above the upper plate, for the purpose and substantially as described.

6. In combination with a gas-generating apparatus constructed with two or more combustion-chambers, connected by a trunk, E, as described, a steam-generator composed of a series of pipes, $r$, and a connected steam-receptacle, S, with pipes $t\ t'\ t''$ and valves T T', communicating with the steam-conduits $u\ u'$, and an air-pipe, $m$, with branches $n\ n'$ leading to each ash-pit, substantially as described.

7. The gas-outlet pipes $p\ p'\ p''$, provided with suitable valve or valves, in combination with a gas-generating furnace having two or more combustion-chambers, $a\ a'$, and a trunk, E, and ash-pits $c\ c'$, for the purpose of conveying gas from either ash-pit, substantially as described.

8. The combination, in a coal-gas apparatus, of the following instrumentalities, viz: First, a coal combustion-chamber, $a$, wherein to produce gas from coal in a state of combustion, as set forth; second, a gas-purifying chamber, $a'$, containing incandescent coal, operating to screen and purify the gas, as specified; and, third, a connecting-trunk, E, operating to convey the gas from the combustion-chamber $a$ to the gas-purifier $a'$, all constructed and operating substantially as described.

9. The smoke-pipe X, with its valve X', in combination with the trunk E and the two connected combustion-chambers $a\ a'$, for the purpose of conveying smoke and arresting the gases from the chambers $a\ a'$ through the trunk E, substantially as described.

In testimony that I claim the foregoing as my own invention I have affixed my signature in presence of two witnesses.

MOSES W. KIDDER.

Witnesses:
ALBAN ANDRÉN,
PERSON NOYES.